(12) United States Patent
Clark et al.

(10) Patent No.: US 6,866,877 B2
(45) Date of Patent: *Mar. 15, 2005

(54) CARBONATED FORTIFIED MILK-BASED BEVERAGE AND METHOD FOR SUPPRESSING BACTERIAL GROWTH IN THE BEVERAGE

(75) Inventors: George H. Clark, Woburn, MA (US); Mary Ann Clark, Woburn, MA (US)

(73) Assignee: MAC Farms, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/352,011

(22) Filed: Jan. 27, 2003

(65) Prior Publication Data

US 2003/0113408 A1 Jun. 19, 2003

Related U.S. Application Data

(63) Continuation-in-part of application No. 10/004,149, filed on Oct. 31, 2001, which is a continuation-in-part of application No. 09/473,252, filed on Dec. 27, 1999, now Pat. No. 6,403,129.
(60) Provisional application No. 60/114,096, filed on Dec. 29, 1998.

(51) Int. Cl.⁷ .............................. A23L 1/29; A23L 1/304
(52) U.S. Cl. .............................. 426/72; 426/73; 426/74; 426/477; 426/580; 426/588; 426/590
(58) Field of Search .............................. 426/72, 73, 74, 426/477, 580, 588, 590

(56) References Cited

U.S. PATENT DOCUMENTS

| | | | |
|---|---|---|---|
| 4,212,893 A | 7/1980 | Takahata | |
| 4,264,638 A | 4/1981 | Sirett et al. | |
| 4,446,164 A | 5/1984 | Brog | |
| 4,460,616 A | 7/1984 | Rialland et al. | |
| 4,737,375 A | 4/1988 | Nakel et al. | |
| 4,738,856 A | 4/1988 | Clark | |
| 4,738,865 A | 4/1988 | Morris | |
| 4,804,552 A | 2/1989 | Ahmed et al. | |
| 4,842,884 A | 6/1989 | Bookwalter et al. | |
| 4,919,960 A | 4/1990 | Ahmed et al. | |
| 4,980,182 A | 12/1990 | Kwon et al. | |
| 5,200,226 A | 4/1993 | Sanchez Rodriguez | |
| 5,202,145 A | 4/1993 | Wisler et al. | |
| 5,366,751 A | 11/1994 | Pordy | |
| 5,413,803 A | 5/1995 | Chung | |
| 5,436,020 A | 7/1995 | Kuwata et al. | |
| 5,607,714 A | 3/1997 | Connolly | |
| 5,624,700 A | 4/1997 | Ogden | |
| 5,648,112 A | 7/1997 | Yang et al. | |
| 5,665,415 A | 9/1997 | Kligerman et al. | |
| 5,817,351 A | 10/1998 | DeWille et al. | |
| 5,834,045 A | 11/1998 | Keating | |
| 6,403,129 B1 * | 6/2002 | Clark et al. | 426/72 |

OTHER PUBLICATIONS

U.S. Appl. No. 09/660,048 filed Sep. 12, 2000; Inventors: George H. Clark, Mary Ann Clark; Title: New Amino Acid Chelates for the Effective Supplementation of Calcium, Magnesium and Potassium in the Human Diet.

* cited by examiner

*Primary Examiner*—Helen Pratt
(74) *Attorney, Agent, or Firm*—Lorusso Loud & Kelly LLP

(57) ABSTRACT

Dairy or non-diary based fortified carbonated beverage solutions that supply essential nutrients in the human diet. The solution contains per 354 ml, calcium, magnesium and potassium ions in the form of salts and optionally vitamins A, D, C, lutein, zeaxanthin and folic acid in specified amounts to provide dietary supplementation. Sweeteners, stabilizers, flavors and carbonation can also be added to enhance flavor, taste, mouth-feel, ingredient solubilization and product appearance. A method of making the beverages is also described. A method of using carbonation to reduce bacterial counts and reduce degradation of essential nutrients in milk-based beverages with or without pasteurization is also disclosed.

45 Claims, No Drawings

CARBONATED FORTIFIED MILK-BASED BEVERAGE AND METHOD FOR SUPPRESSING BACTERIAL GROWTH IN THE BEVERAGE

CROSS-REFERENCE TO RELATED APPLICATIONS

This is a continuation-in-part of pending U.S. Ser. No. 10/004,149, filed Oct. 31, 2001, which is a continuation-in-part of U.S. Ser. No. 09/473,252, filed Dec. 27, 1999, now U.S. Pat. No. 6,403,129, issued Jun. 11, 2002, which claimed the benefit of U.S. Provisional Application No. 60/114,096, filed Dec. 29, 1998, the contents of which are incorporated herein by reference.

FIELD OF THE INVENTION

This invention relates to fortified, carbonated milk-based or non-dairy based beverages for the supplementation of essential nutrients in the human diet. This invention further relates to a method for producing carbonated milk-based or non-dairy based beverages that suppresses the growth of bacterial cultures, and thereby extends product shelf life and increases the palatability of milk to populations who do not like or drink milk. The beverages are designed for consumption by individuals of all ages to provide supplemental amounts of essential vitamins, amino acids, minerals and trace nutrients in the everyday diet.

BACKGROUND OF THE INVENTION

It is now well known that good nutrition is essential to the process of bone physiology. Poor dietary habits will prevent normal bone development in childhood and early adulthood and can contribute to the softening of bones and teeth as well as the acceleration of bone loss with advancing age. Milk has long been recognized as an excellent nutritional source of essential minerals such as calcium and potassium, high quality protein and vitamins such as D, A, $B_2$, $B_1$, $B_6$ and $B_{12}$.

Proper levels of these elements are essential in the diets of children and adolescents for the development and maintenance of healthy teeth and bones and to enhance growth; in adults to improve the tone and elasticity of muscles and ligaments. Such elements also assist in and promote healthy pregnancies, enhance appetite, and in the elderly, help to prevent osteoporosis, colon cancer and heart disease.

A major nutritional problem exists in North America in that the annual consumption of milk per capita is fourth to beer, soft drinks and bottled water. Consumers reject milk for taste, fat content and in susceptible individuals, lactose intolerance. Recommended daily intake levels of vitamins, e.g., A, D, and the B group, as well as minerals, e.g., calcium, magnesium and potassium, cannot be supplemented by other commercial, non-dairy beverages due to unavailability. We know of no prior art that discloses any flavored, fortified, carbonated, milk-based or non-dairy beverages that provide enhanced supplementation of the levels of essential vitamins, minerals and amino acids comparable to those available in fortified milk.

When compared to whole milk and carbonated soft drink beverages, the following results are obtained.

| Per 354 ml. | SKIM MILK | SOFT DRINK | INVENTION |
| --- | --- | --- | --- |
| Calories (kilocalories) | 90 | 162 | 110 |
| Carbohydrates (g) | 16 | 40 | 18 |
| Fat (g) | 0 | 0 | 0 |
| Protein (g) | 8 | 0 | 9 |
| Cholesterol (mg) | 1 | 0 | 1 |
| Vitamin A (IU) | 1000 | 0 | 1000 |
| Vitamin D (IU) | 100 | 0 | 100 |
| Vitamin C (mg) | 0.09 | 0 | 20 |
| B1 (Thiamine) (mg) | 0.17 | 0 | 0.17 |
| B2 (Riboflavin) (mg) | 0.17 | 0 | 0.17 |
| B6 (Pyrodoxine) (mg) | 0.87 | 0 | 0.87 |
| B12 (Cobolamin) (mg) | 1.34 | 0 | 1.34 |
| Folic Acid (IU) | 0 | 0 | 0.05 |
| Sodium (mg) | 122 | 14 | 125 |
| Calcium (mg) | 288 | 11 | 1000 |
| Potassium (mg) | 351 | 7.0 | 638 |
| Phosphorus (mg) | 227 | 750 | 290 |
| Magnesium (mg) | 24 | 4 | 132 |
| Iron (mg) | 0.0 | 0.18 | 0.10 |
| Copper (mg) | 0.0 | 0.10 | 0.0 |
| Carbonation (vols) | 0 | 4.0 | 2.0 |

The chart clearly illustrates how our novel beverage provides, at a minimum, the same nutritional benefit as milk with respect to essential vitamins, minerals and other beneficial substances naturally present in, or added as fortifications to milk. Moreover, the levels of some nutritive substances, e.g., calcium, in our beverage far exceed the levels found in milk. Unless expressly stated otherwise, as used herein, all liquid components are measured in liters or fractions thereof and all solid components are measured in grams or fractions thereof.

U.S. Pat. No. 4,738,856 to Clark et al. discloses calcium, magnesium and potassium aspartate compositions as anti-hypertensive nutrition agents. Clark et al., provides that non-dairy nutritional beverages facilitate and control the transport of calcium ions into the human body while lowering blood pressure and lowering the probability or tendency of incurring colon cancer. Clark et al further discloses that beverages may provide nutritional supplementation of magnesium and/or potassium to the human diet, help reduce premenstrual tension in women, and increase cardiac tolerance in conditions of anoxia.

Clark et al. does not disclose a milk-based nutritional beverage which will provide not only large amounts of calcium, magnesium and/or potassium to the human diet, but also supplementation of essential vitamin A, vitamin D, B complex vitamins, vitamin C, vitamin K, phosphorus, iron and strontium. Clark et al., fails to disclose carbonation of a beverage to enhance the acceptance of the taste of B complex vitamins, minerals and iron in beverage preparations, enhance the mouth-feel of milk products to increase consumer appeal enjoyed by carbonated beverages and extend the shelf life of milk by suppressing the growth of bacteria.

U.S. Pat. No. 5,624,700 to Lyon et al. discloses a process to add carbon dioxide under low shear conditions to an already formed food to produce a semi-solid or solid carbonated food. Lyon et al. does not disclose the carbonation of a dry powder preparation of vitamins and minerals or of milk to produce an enhanced liquid dairy product for the supplementation of high levels of essential vitamins and minerals in human nutrition.

What is needed and what we have invented is an all natural, flavored, fortified, carbonated milk-based beverage that provides high dietary levels of essential vitamins, minerals and amino acids that facilitates their absorption, which aids in the building of healthy bones and teeth and reduces the probability of developing osteoporosis. The inventive beverage also aids in the prevention of rickets in young people and the development of premenstrual tension (PMS) in women. Folic acid of the B-complex vitamins is supplemented by this invention to counter its deficiency in the typical human diet, which may cause megaloblastosis, weight loss, anemia, cardiac enlargement, congestive heart failure, and in pregnant women, development of a fetus with spina bifida. The beverage supplies a rapidly and highly absorbable source of calcium, magnesium and potassium to the human body without gastric upset and stomach bloating, and thus provides an ideal composition for consumption by humans who are "At Risk" of developing bone diseases such as osteoporosis or osteomalacia. The beverage in an alternate formulation further supplies Vitamin E and Carotenoids such as xeazanthin, lycopene and lutein to improve cardiovascular health and eyesight in the elderly.

Another persistent problem with respect to milk-based beverages is the presence of bacteria such as coliform, an enteric variety. Pasteurization has been, until now, the standard method used to eliminate, or at least minimize the development of bacterial colonies so as to extend the useable shelf life of milk or milk-based products. Pasteurization, in its simplest form, involves the application of heat to a substance for a specified time to destroy potentially harmful microorganisms. Variations on the standard pasteurization method have been developed to further extend the shelf life of products such as milk. One such variation is known as HTST (high temperature short time) pasteurization that utilizes temperatures of from about 165° F. to about 195° F. and time periods from about 2 seconds to about 30 seconds. Exposure time is inversely proportional to the temperature used.

A second variation is VAT pasteurization that utilizes temperatures up to about 175° F. for a time period up to about 40 minutes. A yet further variation, UHT (ultra-high temperature) pasteurization, utilizes temperatures in excess of 215° F. for about 2 to about 5 seconds. UHT pasteurization is often used to extend the shelf life of chocolate flavored milk drinks from 14 days under refrigeration with standard heat pasteurization to up to 90 days under refrigeration, and is the method typically used when chocolate milk drinks are to be kept refrigerated on store shelves for over 21 days. Whether standard or UHT pasteurization is used, stabilizers and preservatives have to be added to provide a stable product. If vitamins and minerals are added to flavored milk drinks that are to be pasteurized, gel binders are also added to stabilize the flavors, colors and nutritive additions. Gel binders present additional problems. It is well known that various gel binders have a significant negative laxative effect on susceptible individuals, e.g., children and the elderly. This is a yet further reason why certain individuals forego drinking even flavored milks.

Problems with off flavors and poor mouth feel may persist when standard methods of UHT pasteurization are used, even with the use of stabilizers and preservatives. It is known that exposing milk or milk-based products to high heat may degrade certain components such as Riboflavin and Vitamin A, destroys Vitamin C, and breaks down lactose, a disaccharide sugar into its monosaccharide components. The latter effect generates off flavors. What is needed is an alternative to traditional methods of Pasteurization that extends the useful shelf life of milk-based products without causing any degradation in the product, and without needing binders, stabilizers or preservatives.

We have discovered that by exposing milk-based beverages to $CO_2$ pre-pasteurization, the growth of bacteria colonies can be suppressed, and degradation of flavors and nutrients can be reduced if UHT pasteurization is employed and the need for gel binders or stabilizers can be eliminated. In fact, depending on the amounts of $CO_{2\ added}$, the need for traditional pasteurization can also be eliminated without any appreciable negative impact on the suppression of bacteria.

SUMMARY OF THE INVENTION

The beverage disclosed herein serves as a means of enhancing the attractiveness of milk based beverages in the marketplace as well as providing a delicious source of essential nutritional elements in the daily diet needed to improve the daily diet of children, reduce obesity, reduce the incidence of cardiovascular disease and high blood pressure in adults, promote the formation of healthy bones and teeth, reduce the incidence of osteoporosis and increase physical vigor, strength and endurance. The beverage also supplies more rapidly absorbed and higher levels of calcium, magnesium and potassium without gastric upset and stomach bloating. This invention further provides a pleasant vehicle for the consumption of the recommended daily requirements of essential nutrients by youth who are "AT RISK" of developing rickets, osteomalacia and other bone diseases.

The beverage described herein has carbonation to enhance taste, improve body and mouth-feel, increase acceptability of dairy beverages and aid in the stabilization of milk protein such as Lactalbumin and Casein. In one embodiment, the activity of milk lactose is neutralized by the addition of the enzyme lactase to reduce the possibility of allergic response such as lactose intolerance in susceptible individuals. Optionally, pure crystalline fruit fructose or a non-nutritive sweetener, or combinations thereof, such as sucralose, or sucralose and acesulfame K, can be added to enhance taste and flavor.

Flavors such as chocolate fudge, chocolate, vanilla, mocha, almond, coconut, latte, butterscotch, coffee and fruit flavors such as peach, orange, raspberry, strawberry, saskatoon berry, blueberry, plains berry, prairie berry and apple as well as mixtures thereof can be added to enhance taste and acceptability.

Also disclosed is a method of making the beverage that employs, in one embodiment, the addition of $CO_2$ pre-Pasteurization to eliminate or effectively reduce the growth of bacterial colonies in the beverage and reduce degradation of nutrients if UHT pasteurization is used. In another embodiment, a variety of gases are used to de-aerate the beverage to enhance the stability of the underlying mixture.

DESCRIPTION OF THE ILLUSTRATIVE EMBODIMENT

The beverage composition in its broadest aspect comprises nonfat dry milk, milk (whole or 1%, 2% fat), skim milk, milk whey, milk protein concentrate, soy milk, yogurt or a non-dairy milk substitute containing sweet dairy whey, dried corn syrup, sodium caseinate and partially hydrogenated soybean oil. Alternatively the composition can be comprised of nonfat dry milk, skim milk, milk (whole or 1%, 2% fat), milk whey, milk protein concentrate, soy milk or yogurt and can be combined with a mixture of nonfat dry milk, skim milk, milk (whole or 1%, 2% fat), milk whey, milk protein concentrate, soy milk or yogurt and/or the milk substitute. More particularly, the beverage composition comprises a beverage solution containing in each 354 ml: from about 0.01 g to about 1000 g of nonfat dry milk and/or from about 1 ml to about 350 ml of skim milk and/or from about 1 ml to about 350 ml milk (whole or 1%, 2% fat), and/or from about 1 gm to about 500 g milk whey, and/or from about 1 mg to about 800 mg milk protein concentrate, and/or from about 1 ml to about 350 ml soy milk, and/or from about 1 mg to about 200 g yogurt, and/or from about 1 g to about 500 g of a nonfat milk substitute containing sweet dairy whey, dried corn syrup, sodium caseinate, partially hydrogenated soybean oil and/or mixtures thereof.

The beverage compositions also broadly comprise purified water per 354 ml of beverage solution of from about 1 ml to about 344 ml of solution. The beverage compositions further comprise a beverage solution containing per 354 ml: from about 1 mg to about 7600 mg of calcium picolinate, and/or from about 1 mg to about 7600 mg of calcium aspartate, and/or from about 1 mg to about 9,000 mg of calcium gluconate, and/or from about 1 mg to about 9,000 mg of calcium ascorbate, and/or from about 1 mg to about 9,000 mg of calcium lactate and/or mixtures thereof.

The calcium picolinate, calcium aspartate, calcium gluconate, calcium ascorbate and/or calcium lactate in these quantities provide a more easily assimilatable source of from about 0.01 meq to about 119 meq of calcium ions. Preferably, from about 0.01 meq to about 71 meq of calcium ions (or from about 2.1 mg to about 1400 mg of calcium ions) is provided to the human body with each 354 ml of beverage solution.

The calcium ions are bivalent cations, which combine with the picolinate, aspartate, gluconate, ascorbate and lactate ligands through coordination. The coordinating picolinate, aspartate, gluconate, ascorbate or lactate ligands are attached to the bivalent cations (electron acceptors) by means of a lone pair of electrons.

After ingestion, the bivalent cations (calcium ions) remain bonded to the picolinate, aspartate, gluconate, ascorbate or lactate ligands and are selectively absorbed through the intestinal membrane of humans. Thus, the beverage compositions comprise beverage solutions containing per 354 ml: from about 0.01 meq to about 71 meq of calcium ions supplied by from about 1 mg to about 7600 mg of calcium picolinate and/or calcium aspartate where the 0.01–71 meq of calcium ions are bonded to the picolinate, aspartate, gluconate, ascorbate or lactate donor agent within the beverage solution and are included within the compounds calcium picolinate, calcium aspartate, calcium gluconate, calcium ascorbate and/or calcium lactate.

The beverage composition also broadly comprises calcium phytate and/or a calcium compound selected from the group consisting of calcium acetate, calcium caseinate, calcium glutamate, calcium pyruvate, calcium palmitate and mixtures thereof. More specifically, the beverage compositions comprise a beverage solution containing per 354 ml: from about 0.01 mg to about 1700 mg of calcium phytate, and/or from about 0.01 mg to about 1700 mg of calcium acetate, and/or from about 0.01 mg to about 1700 mg of calcium caseinate and/or from about 0.03 mg to about 3700 mg of a mixture of calcium phytate, calcium acetate and/or calcium caseinate.

Should the calcium compound include calcium glutamate, calcium phytate and/or calcium palmitate, the beverage compositions would comprise a beverage solution containing per 354 mg: from about 0.01 mg to about 1700 mg of calcium glutamate, from about 0.01 mg to about 7000 mg of calcium palmitate and/or from about 0.01 mg to about 9500 mg of a mixture of calcium glutamate, calcium phytate and calcium palmitate.

Alternatively, the beverage compositions of this invention comprise a beverage solution containing per 354 ml: from about 1 mg to about 9400 mg of a calcium compound selected from the group consisting of calcium acetate, calcium caseinate and mixtures thereof. The calcium phytate, calcium acetate, calcium caseinate, calcium glutamate, calcium pyruvate and/or calcium palmitate (or any of the calcium compounds including calcium acetate, calcium aspartate, calcium ascorbate, calcium gluconate, calcium picolinate, calcium lactate) in these quantities provide from about 0.01 meq to about 71 meq of calcium ions (or from about 2.1 mg to about 1400 mg of calcium ions) to the human body per 354 ml of beverage solution.

The calcium ions combine with the bidentate ligands (picolinate, aspartate, gluconate and pyruvate) by coordinate bonding and remain bonded to the ligands until after transport through the intestinal barrier by selective absorption. Calcium ions, which are not bonded to bidentate ligands generally, are not absorbed through the amino acid selective loci of the human intestinal membrane. To enhance the addition of calcium to the beverage composition, tri-calcium phosphate can be added. From about 10 mg to about 7000 mg of tri-calcium phosphate may be added at ambient to 90° F. with agitation to assure solubalization of the mineral compound.

The beverage composition further broadly comprises the above described calcium compounds and a magnesium compound selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and/or mixtures thereof.

More particularly, the beverage composition comprises a beverage solution containing per 354 ml: from about 0.01 mg to about 10,000 mg of magnesium picolinate and/or from about 1 mg to about 9400 mg of a magnesium compound selected from the group consisting of magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof and/or from about 2 mg to about 3900 mg of magnesium aspartate, magnesium gluconate, magnesium acetate, magnesium pyruvate, magnesium palmitate, magnesium ascorbate, and/or magnesium lactate and/or from about 0.01 mg to about 10,000 mg of magnesium phytate and/or magnesium caseinate and/or from about 2 mg to about 4000 mg of magnesium glutamate and/or from about 1 mg to about 9700 mg of a magnesium compound selected from the group consisting of magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof. To enhance the addition of magnesium to the beverage composition, di-magnesium trihydrate can be added from about 0.01 mg to about 100 mg.

The described calcium compounds and magnesium compounds in these indicated quantities provide from about 0.01 meq to about 71 meq of calcium ions and from about 0.01 meq to about 60 meq of magnesium ions to the human body with each 354 ml of beverage solution. The magnesium ions are bivalent cations that combine with the picolinate, aspartate, gluconate, ascorbate or lactate ligands though coordination. The coordinating ligands are attached to the bivalent cations by means of a lone pair of electrons. After ingestion, these bivalent cations (magnesium ions) remain bonded to the ligand and are selectively absorbed through the intestinal membrane of humans.

The magnesium ions released or disassociated from the magnesium compounds help to facilitate the selective absorption of the calcium compounds through the intestinal loci and into the blood stream of humans. In one embodiment of the beverage composition, the beverage solution contains per 354 ml: from about 0.01 meq to about 71 meq of calcium ions and from about 0.01 meq to about 60 meq of magnesium ions supplied by from about 2 mg to about 9700 mg of a magnesium compound selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof.

The embodiment can additionally comprise from about 0.01 meq to about 50 meq of potassium ions supplied by from about 0.01 mg to about 11,000 mg of potassium picolinate, and/or from about 10 mg to about 1200 mg of potassium aspartate, and/or from about 10 mg to about 3500 mg of potassium gluconate, and/or from about 10 mg to about 2500 mg of potassium ascorbate, and/or from about 19 mg to about 2300 mg of potassium lactate, and/or from about 0.01 mg to about 5000 mg of potassium phytate, and/or from about 10 mg to about 2600 mg of potassium acetate, and/or from about 10 mg to about 2700 mg of magnesium glutamate, and/or from about 2 mg to about 4000 mg of potassium pyruvate, and/or from about 0.01 mg to about 3700 mg of potassium palmitate, and/or from about 10 mg to about 3100 mg of a mixture of a potassium compound selected from the group consisting of potassium picolinate, potassium aspartate, potassium gluconate, potassium ascorbate, potassium lactate, potassium phytate, potassium acetate, potassium caseinate, potassium glutamate, potassium pyruvate, potassium palmitate and mixtures thereof.

The potassium ion tends to form weak bonds due to the presence of a single valence electron. However, the potassium ion can be complexed with an amino acid and therefore remain complexed to picolinate, aspartate, gluconate, pyruvate or glutamate until after passage through the intestinal walls of humans. Whenever the beverage composition is comprised of from about 0.01 meq to about 50 meq of potassium ascorbate, potassium lactate, potassium phytate, potassium acetate or potassium caseinate, the potassium compound will dissociate with the potassium ion and be free to complex with an excess of any picolinate, aspartate, gluconate, pyruvate or glutamate present. To enhance the addition of potassium to the beverage composition, di-potassium phosphate can be added from about 0.01 mg to about 100 mg.

The invention also comprises a sweetener agent selected from the group consisting of sucrose, high fructose corn syrup, invert sugars, crystalline fructose, fructose polymers, aspartame, glucose, glucose polymers, sucralose, Saccharine and mixtures thereof. Preferably, the sweetener agent is selected from the group consisting of sucrose, crystalline fructose, fructose polymers, glucose, glucose polymers, Aspartame, sucralose, acesulfame K, fructose syrup, glucose syrup, corn syrup, invert sugar, sugar alcohols, maple syrup, honey, fruit syrups (apple, grape, and pear) and/or mixtures thereof. Most preferably, the sweetener agent for the non-dietetic formulation is crystalline fructose, fructose syrup, corn syrup or fruit syrups, and for the dietetic formulation is sucralose or Aspartame, acesulfame K and/or mixtures thereof.

Crystalline fructose is the preferred sweetener agent for the invention in the non-dietetic form. Fructose is absorbed by humans through a facilitated diffusion process. Its movement across the intestinal membrane is more rapid than would be expected from simple diffusion. Facilitated diffusion involves the intermediary formation of a complex with a specific transport or carrier protein. If crystalline fructose is used as the sweetening agent, from about 0.01 g to about 50 g is used per 354 ml of beverage solution. If fructose polymers are used as a sweetening agent for this invention, from about 0.1 g to about 1000 g is used per 354 ml of beverage solution. Fructose polymers, as is known in the art, impart enhanced nutritional activity due to the way the substance is transported through the intestinal tract and processed by the body.

If sucrose is used as the sweetener, from about 0.01 g to about 100 g is used per 354 ml of beverage solution. If Aspartame is used as the sweetener, from about 0.05 g to about 30 g is used per 354 ml of beverage solution. If sucralose is used as the sweetener, from about 0.01 g to about 30 g is used per 354 ml of beverage solution. If acesulfame K is used as the sweetener, from about 0.01 g to about 20 g is used per 354 ml of beverage solution. If glucose polymers are used as the sweetener, from about 0.01 g to about 1000 g is used per 354 ml of beverage solution. If glucose is used as the sweetener, from about 0.01 g to about 100 g is used per 354 ml of beverage solution.

If Saccharine is used as the sweetener, from about 0.01 g to about 10 g is used per 354 ml of beverage solution. If fructose syrup is used as the sweetener, from about 0.5 g to about 100 g is used per 354 ml beverage solution. If glucose syrup is used as the sweetener, from about 0.3 ml to about 100 ml is used per 354 ml beverage solution. If corn syrup is used as the sweetener, from about 0.5 ml to about 100 ml is used per 354 ml beverage solution. If invert sugar is used as the sweetener, from about 0.5 g to about 100 g is used per 354 ml beverage solution. If sugar alcohols are used as the sweetener, from about 0.2 g to about 100 g is used per 354 ml beverage solution. If maple syrup is used as the sweetener, from about 0.1 g to about 100 g is used per 354 ml beverage solution. If honey is used as the sweetener, from about 1.0 g to about 100 g is used per 354 ml beverage solution. If fruit syrups (apple, grape, pear) are used as the sweetener, from about 1.0 g to about 100 g is used per 354 ml beverage solution. If crystalline fructose, fructose polymers, fructose syrup, glucose, glucose syrup, corn syrup, invert sugar, sugar alcohols, maple syrup, honey, fruit syrups (apple, grape, pear), acesulfame K, glucose polymers, sucrose, Aspartame, Saccharine, sucralose and/or mixtures thereof are used as the sweetener, from about 0.01 g to about 200 g is used per 354 ml of beverage solution.

The beverage composition further can include a flavoring agent such as chocolate fudge, chocolate, vanilla, strawberry, prairie berry, mocha, latte, peach, almond, coconut, raspberry, saskatoon berry, plains berry, apple, orange, butterscotch, coffee, blueberry, bubble gum, cola, root beer, guarana and/or mixtures thereof. Flavors and/or mixtures thereof chosen from the list above will be added from about 0.01 g to about 50 g per 354 ml of beverage solution.

The beverage composition of all mixtures of this invention can also broadly comprise from about 50 IU (international units) to about 600 IU of vitamin D per 354 ml of beverage solution. The vitamin D is to be added in the above concentration to any mixture of the beverage solution.

Additionally, the beverage composition of all embodiments of the invention can comprise vitamin C (ascorbic acid). The vitamin C can be added from about 0.1 mg to about 1000 mg to any and all embodiments of the invention per 354 ml of beverage solution.

The beverage composition can also comprise folic acid. The folic acid can be added from about 0.001 mg to about 0.40 mg to all embodiments of the invention per 354 ml of beverage solution. The beverage composition can also comprise vitamin A. The vitamin A can be added from about 200 IU to about 5000 IU to any and all embodiments of the invention per 354 ml of beverage solution.

Alternatively, or in addition, carotenoid can be added, which is a precursor of vitamin A. Zeaxanthin, lutein and lycopene are three carotenoids suitable for the beverage compositions herein described. If lutein is added as a carotenoid, then from about 0.0002 g to about 0.0009 g is added per 354 ml of beverage solution. If zeaxanthin is added as a carotenoid, then from about 0.0002 g to about 0.0009 g is added per 354 ml of beverage solution. If lycopene is added as a carotenoid, then from about 0.0002 g to about 0.0009 g is added per 354 ml of beverage solution.

It should be noted that there is no need to supplement the beverage compositions with the B complex vitamins, vitamin K, and phosphorous in the skim milk, nonfat dry milk powder, milk (whole or 1%, 2% fat) and yogurt. Adequate dietary quantities of these vitamins and minerals are present in the dairy elements.

A yet further optional nutritive additive is soy or more specifically, soy protein. Soy is known to contain phytoestrogens, which may have beneficial effects with respect to breast cancer. Amounts in excess of 10 micrograms added to the mixture are expected to produce the desired anti-cancer effect.

An additional optional nutritive additive is carotenoid, which is a precursor of vitamin A.

All mixtures of the beverage solution disclosed herein can also comprise the addition of a preservative. The preservative used is preferably natural and bacteriostatic. The preferred preservative is benzoic acid and/or a benzoate compound such as sodium benzoate, potassium benzoate, calcium benzoate and/or magnesium benzoate. When used in any and all embodiments of the invention, these compounds comprise from about 0.15 g to about 0.70 g of benzoic acid, sodium benzoate, potassium benzoate, calcium benzoate, magnesium benzoate and/or mixtures thereof per 354 ml of beverage solution.

The beverage composition also comprises the addition of carbonation, i.e., the forceful introduction of carbon dioxide gas, under pressure, against a liquid surface, which causes the absorption of the gas into, and in the case of this invention, solubilization by the liquid. Preferably, from about 0.10 volumes to about 4 volumes of gas is added per 354 ml of beverage solution. The higher the gas pressure and the cooler the liquid, the more carbonation that is dissolved. Carbonation has the effect of enhancing the flavor, sweetness, taste, and mouth-feel and lowering the pH of the beverage as well as changing the viscosity to render it more desirable.

Another aspect of the invention is the method used to prepare the beverage composition. With any of the embodiments, a predetermined volume of a liquid solvent (e.g., filtered water or purified water) is used. In the nonfat dry milk embodiment, purified water (that can be obtained, for example, by using reverse osmosis on undistilled water as is well known in the art) is used to eliminate undesirable impurities that are commonly present in unpurified municipal water such as bacteria suppressing additives, organic and inorganic chemicals, radionuclides, pesticides, fluoride and the like. Such impurities can interfere with the solubility and function of the desired ingredients as well as impart undesirable taste. In general, from about 10 ml to about 344 ml of purified water should be used for every 354 ml of beverage solution to be produced.

The water should be brought to and maintained at ambient temperature (70°–74° F.) to enhance solubility and prevent clumping of the solid ingredients to be added. After a selected amount of water is obtained, from about 1 g to about 1000 g of non-fat dry milk powder (prepared by low heat or freeze-dry methods as is known in the art) or from about 1 g to about 35 g of non-fat milk substitute powder containing sweet dairy whey, dried corn syrup, sodium caseinate and partially hydrogenated soybean oil or mixtures thereof is added to the beverage mixture. In an alternate embodiment, about 350 ml of skim milk, milk (whole or 1%, 2% Fat), soy milk, liquid milk whey, yogurt and/or mixtures thereof can be used in place of the water solvent and one or both of the non-fat dry milk powder and the non-fat substitute powder. It is to be understood that the methods used to prepare the non-fat dry milk or the non-fat substitute powder (substances which are commercially available) are not part of the invention. When the starting ingredient is fluid milk or milk whey, the addition of water is eliminated.

In a preferred embodiment, from about 1.0 g to about 1000 g of non-fat dry milk is added to from about 150 ml to about 190 ml of preferably purified water. The mixture is stirred at low shear for at least two minutes. After stirring, from about 1.0 mg to about 7600 mg of a calcium salt selected from the group consisting of calcium picolinate, calcium aspartate and mixtures thereof or from about 1.0 mg to about 9000 mg of a calcium salt selected from the group consisting of calcium gluconate, calcium lactate, calcium ascorbate and mixtures thereof or from about 0.01 mg to about 1700 mg of a calcium salt selected from the group consisting of calcium phytate, calcium acetate, calcium caseinate, calcium glutamate, calcium palmitate and mixtures thereof or from about 10 mg to about 9400 mg of calcium pyruvate or mixtures of any of the identified calcium salts are added to each 354 ml of the beverage mixture. The mixture is stirred for a second time for at least two minutes.

Following the second stirring step, from about 2.0 mg to about 3900 mg of a magnesium salt selected from the group consisting of magnesium aspartate, magnesium gluconate, magnesium ascorbate, magnesium lactate, magnesium acetate or from about 0.01 mg to about 10000 mg of a magnesium salt selected from the group consisting of magnesium phytate, magnesium caseinate, magnesium pyruvate, magnesium palmitate, magnesium piconlinate and mixtures thereof or from about 0.01 mg to about 10,000 mg of magnesium glutamate and mixtures of any of the identified magnesium salts are added to each 354 ml of the beverage mixture. The mixture is again stirred for at least two minutes.

Following the addition of the magnesium salt, a potassium salt is added to the mixture. From about 21 mg to about 11000 mg of potassium picolinate, and/or from about 10 mg to about 1200 mg of potassium aspartate, and/or from about 10 mg to about 3500 mg of potassium gluconate, and/or from about 21 mg to about 2500 mg of potassium ascorbate, and/or from about 19 mg to about 2300 mg of potassium lactate, and/or from about 10 mg to about 5000 mg of potassium phytate, and/or from about 10 mg to about 2600 mg of potassium acetate, and/or from about 10 mg to about 2700 mg of potassium glutamate, and/or from about 10 mg to about 4000 mg of potassium pyruvate, and/or from about 10 mg to about 3700 mg of potassium palmitate and/or mixtures thereof are added to each 354 ml of the beverage mixture. The mixture is again stirred for at least two minutes.

Optionally, from about 50 IU to about 600 IU of vitamin D is added to each 354 ml of the beverage mixture which is stirred for an additional two minutes. Also optionally, from about 200 IU to about 2000 IU of vitamin A is added to each 354 ml of the beverage mixture, which is stirred for another two minutes. Also optional is the addition of from about 0.001 mg to about 0.40 mg of folic acid to each 354 ml of the beverage mixture, which is stirred yet again for at least two minutes.

A sugar or sugar substitute is also added to the mixture. From about 0.01 g to about 50 g of crystalline fructose and/or from about 0.01 g to about 100 g of sucrose and/or from about 0.10 g to about 1000 g of fructose polymers and/or from about 0.05 g to about 30 g of Aspartame® and/or from about 0.01 g to about 30 g of sucralose and/or from about 0.01 g to about 100 g of glucose and/or from about 0.01 g to about 20 g of Saccharine® and/or from about 0.01 g to about 20 g of acesulfame K and/or from about 0.01 g to about 1000 g of glucose polymers and/or from about 0.5 g to about 100 g fructose syrup and/or from about 0.5 g to about 100 g invert sugar and/or mixtures thereof are added to each 354 ml of the beverage mixture. The mixture is again stirred for at least two minutes.

To enhance the taste of the mixture, from about 0.1 mg to about 50 mg of a flavoring agent selected from the group consisting of chocolate fudge, chocolate, vanilla, strawberry, prairie berry, mocha, latte, peach, almond, coconut, raspberry, saskatoon berry, plains berry, apple, orange, butterscotch, coffee, blueberry, cola, root beer and mixtures thereof is added. The mixture is again stirred for at least two minutes.

Optionally, an acidulant can be added, to adjust the pH of the mixture. Acidulants useful with the invention include, but are not limited to, tartaric acid, ascorbic acid, malic acid, lactic acid, citric acid and fumaric acid. Tartaric, malic and fumaric are particularly advantageous in that these acidulants appear to enhance the absorption of minerals such as calcium, magnesium and potassium. Phosphoric acid is not used for it prevents the absorption of calcium. If an acidulant is used, it is important that the pH be monitored to prevent the composition's pH from dropping below the isoelectric point of milk protein, which is 4.7 pH. When using tartaric, malic, fumaric, lactic, ascorbic and citric acids as acidulants, use from about 0.01 g to about 10 g per 354 ml beverage solution.

The carotenoids, if used, as well as the di-potassium phosphate, di-magnesium phosphate and tri-calcium phosphate are added in the beginning after heating the water, milks or milk whey. They are then added with stirring until dissolved.

Another issue that arises when mixing and blending the ingredients is the undesirable introduction of aeration into the mixture. Oxygen is trapped in the mixture during blending, which can destabilize the product if allowed to remain resident in the mixture. To eliminate the presence of unwanted oxygen, a gas is used to de-aerate the mixture. Suitable gases include carbon dioxide, nitrogen or any inert gas such as argon. Each will eliminate the presence of oxygen; carbon dioxide, however, is the only de-aeration gas that will be solubilized in the mixture and is preferable since it will also be used for the carbonation of the beverage.

Pre-pasturization, the carbon dioxide is bubbled into the bottom of the mixing tank after mixing all ingredients. For purposes of adding carbonation, carbon dioxide gas is added to the milk mixture, in line, just after pasteurization. The temperature of the fluid mixture, in line, should be brought down below 40° F. and the carbon dioxide gas flow is controlled with a regulator to between 500 ppm to 3000 ppm.

Following the addition of all essential and optional ingredients, the mixture is pasteurized in accordance with applicable Federal guidelines for grade A milk processing to ensure safety for consumption. The mixture is preferably maintained within a pH range of from about 4.7 to about 7.0. Carbon dioxide gas is used as the pH adjusting agent. From about 0.1 volumes to about 4.0 volumes per 354 ml of beverage solution is used to maintain the solution within the desired pH range. The higher the $CO_2$ content, the lower the pH.

To facilitate the carbonization of the mixture, the beverage mixture is cooled to a temperature range of from about 32° F. to about 68° F. Pressurized carbon dioxide ($CO_2$) gas is forced through the beverage mixture from about 0.1 volumes to about 4.0 volumes per 354 ml of beverage mixture. Alternatively, the carbonation may be added by reducing the initial purified water used to from about 10 ml to about 150 ml and then adding from about 190 ml to about 350 ml of purified carbonated water with a carbonation volume of from about 0.1 volumes to about 4.0 volumes per 354 ml of beverage or beverage solution.

After the addition of the carbon dioxide gas or, alternatively, the carbonated water, the beverage mixture is mixed in a closed container for at least two minutes. The mixture is then dispensed into coated aluminum or steel beverage cans and/or PET containers and/or glass containers and/or aluminum foil lined EVOH (ethylene vinyl alcohol) containers and immediately sealed to retain carbonation using closure methods well known in the art. To maintain the taste quality of the beverage, the beverage must be stored at temperatures in the range of from about 34° F. to about 72° F.

In an alternate embodiment, a dry beverage mixture embodiment, the beverage mixture is prepared as described above with the following exceptions: 1) the water (purified or unpurified) is not added; 2) all the solid essential and desired optional ingredients are combined and blended in a ribbon or dry blender; 3) the carbon dioxide gas is not added to the preparation; and 4) the dry mixture is packaged in polyethylene-foil-polyethylene laminate pouches for later use. This allows the pre-beverage mixture of solids to be stored for long periods of time without having to take precautions to prevent carbonation depletion such as maintaining the mixture at a selected temperature range. When the liquid beverage is desired, water and carbonation are added to the mixture using the methods described above to produce a completed beverage mixture that is ready for consumption.

To inhibit the growth of bacterial colonies in the various beverage embodiments, the beverage can be pasteurized prior to the addition of the $CO_2$. HTST pasteurization is the preferred method. However, other methods known well in the art can also be used with the addition of $CO_2$ gas to achieve the same bacteria suppression but not cause degradation of nutrients, e.g., VAT, UHT or aseptic pasteurization. If HTST pasteurization is used, the beverage, pre-carbonation, is subjected to 180° F. heat for about 30 seconds up to about 185° F. heat for about 20 seconds. If VAT pasteurization is used, the beverage, pre-carbonation, is subjected to temperatures up to about 185° F. for up to about 40 minutes. If UHT or aseptic pasteurization is used, the beverage, pre-carbonation is pasteurized at temperatures in excess of 215 degrees F for 5 seconds. $CO_2$ gas may be added to the mixture prior to UHT pasteurization to reduce degradation of essential nutrients.

In an alternate embodiment, $CO_2$ is bubbled into the beverage pre-pasteurization step, in an amount ranging from about 500 to about 10,000 parts per million (ppm) at ambient temperature for up to 5 minutes. By employing this procedure, the total colony count of bacteria normally present in a milk-based medium was decreased six-fold. It was found that the higher the $CO_2$ amount and the longer the product was exposed to $CO_2$, the lower the bacterial count. Another added benefit is the demonstrable increase in the solubility of Calcium, Magnesium and Potassium salts and flavoring agents. A yet further benefit of pre-Pasteurization $CO_2$ introduction is the ability to use lower amounts of flavorings and sweeteners due to the sensory enhancement effects of the $CO_2$. A still further advantage is the elimination of the need for homogenization, which reduces the production costs and eliminates possible deleterious effects on ingredient solubility and the undesirable effects of introducing the mixture to high temperatures during the homogenization process.

Optionally, the beverage can then be pasteurized using any of the known pasteurization methods. If pasteurization is used, $CO_2$ has to be reintroduced into the beverage since pasteurization disseminates most $CO_2$ present. First, the beverage's temperature has to be brought down to from about 185° F.–215° F. to below 40° F. after pasteurization. Preferably, the beverage mixture is transported through chilled stainless steel or glass pipes for a minimum distance of 50 feet with back pressure to assure thorough mixing. $CO_2$ is bubbled into the beverage mixture at a rate of from about 500 ppm to about 3000 ppm. The combination of milk protein, low temperature and length of the flow tube used to introduce $CO_2$ into the beverage mixture maximizes the $CO_2$ concentration to preferably from about 500 ppm to about 3000 ppm in the finished product. 500 ppm is about 0.25 volumes. $CO_2$ concentrations are expressed herein in either ppm or volume units. To convert from one unit to the other, 1000 ppm is equivalent to about 0.5 volumes. If heat pasteurization is to be omitted, then the $CO_2$ added at the pre-pasturization step must be added in a closed vessel with the internal temperature reduced to below 40° F. to support solution.

Beverages made with the $CO_2$-Pasteurization-$CO_2$ combination exhibited bacterial counts of less than 60 colonies per field. No coliform colonies were found. The effective shelf life of the disclosed milk-based beverages was increased by 60 days to over 70 days with refrigeration. It is fully expected that similar results should be realized even without the pasteurization step, based on the test results taken after the initial $CO_2$ infusion, described above. It is thus possible to prepare milk-based beverages without pasteurization and achieve acceptable bacteria levels. Elimination of the pasteurization step should also reduce production costs as carbonating a beverage is much less expensive than pasteurizing the same beverage, particularly with respect to equipment and energy needs.

It is to be understood that the sequence of adding the ingredients as set forth herein is not essential to the production of the beverage mixture with one exception. It is important that the calcium salt(s) be added to the mixture before the magnesium salt(s) to prevent undesired clumping.

Having described the invention, it should be understood that the foregoing description of the invention is intended merely to be illustrative thereof and that other modifications, embodiments and equivalents may be apparent to those who are skilled in the art without departing from its spirit. Having thus described the invention, what we claim as new and desire to secure by United States Letters Patent is:

What is claimed is:

1. A beverage composition suitable for human consumption comprising per 354 ml of composition:
   from about 10 ml to about 344 ml of water and from about 0.01 gm to about 50 gm of dry milk powder and/or soy protein;
   from about 1 ml to about 354 ml of milk and/or yogurt and/or milk whey and/or milk protein concentrates (MPC);
   from about 0.01 meq to about 119 meq of calcium ions supplied from about 1 mg to about 9,000 mg of a calcium salt selected from the group consisting of calcium picolinate, calcium aspartate, calcium gluconate, calcium ascorbate, calcium benzoate, tricalcium phosphate and mixtures thereof;
   from about 0.01 g to about 1000 g of a nutritive or non-nutritive sweetener; and
   from about 0.1 volumes to about 5 volumes of carbon dioxide gas.

2. The beverage composition of claim 1 wherein the sweetener is crystalline fructose, acesulfame K, saccharine, aspartame, sucralose, fructose polymers, glucose, glucose polymers, invert sugar, fructose syrup, glucose syrup, corn syrup, sucrose, sugar alcohols, maple syrup, honey, fruit syrups (apple, grape, pear), sucralose and/or mixtures thereof.

3. The beverage composition of claim 2 further comprising from about 0.01 g to about 50 g of a flavoring agent.

4. The beverage composition of claim 3 wherein the flavoring agent is selected from the group consisting of chocolate fudge, chocolate, vanilla, vanilla cappuccino, guarana, strawberry, prairie berry, mocha, latte, peach, almond, coconut, raspberry, bubblegum, cotton candy, saskatoon berry, plains berry, apple, orange, butterscotch, coffee, blueberry, papaya, orange, cherry, tea, banana, lemon, lime, grape, watermelon cola, root beer and mixtures thereof.

5. The beverage composition of claim 2 further comprising from about 50 IU to about 600 IU of vitamin D.

6. The beverage composition of claim 2 further comprising from about 0.1 mg to about 1000 mg of vitamin C.

7. The beverage composition of claim 2 further comprising from about 200 IU to about 5000 IU of vitamin A.

8. The beverage composition of claim 2 further comprising from about 0.001 mg to about 0.40 mg of folic acid.

9. The beverage composition of claim 2 further comprising from about 50 IU to 500 IU of Vitamin E.

10. The beverage composition of claim 2 further comprising from about 0.0002 g to 0.0009 g lutein.

11. The beverage composition of claim 2 further comprising from about 0.0002 g to 0.0009 g zeaxanthin.

12. The beverage composition of claim 2 further comprising from about 0.1 mg to 100 mg tricalcium phosphate.

13. The beverage composition of claim 2 further comprising from about 50 IU to about 600 IU of vitamin D; from about 0.1 mg to about 1000 mg of vitamin C; from about 200 IU to about 5000 IU of vitamin A and from about 0.001 mg to about 0.4 mg of folic acid.

14. The beverage composition of claim 2 further comprising from about 0.15 g to about 0.70 g of a preservative.

15. The beverage composition of claim 14 wherein the preservative is benzoic acid or a benzoate compound selected from the group consisting of sodium benzoate, potassium benzoate, calcium benzoate, magnesium benzoate, citric acid, lactic acid and mixtures thereof.

16. The beverage composition of claim 2 wherein the composition has a pH of from about 4.7 to about 7.0.

17. The beverage composition of claim 2 further comprising lactase in an amount sufficient to at least partially eliminate the activity of milk lactose.

18. The beverage composition of claim 2 wherein the water comprises filtered water, distilled and/or purified water and/or mixtures thereof.

19. The beverage composition of claim 2 further comprising from about 0.01 meq to about 60 meq of magnesium ions supplied from about 0.01 mg to about 10,000 mg of a magnesium salt selected from the group consisting of magnesium picolinate, magnesium aspartate, magnesium gluconate, magnesium ascorbate, magnesium benzoate, magnesium phytate, magnesium acetate, magnesium caseinate, magnesium glutamate, magnesium pyruvate, magnesium palmitate, dimagnesium phosphate and/or mixtures thereof.

20. The beverage composition of claim 2 further comprising from about 0.01 meq to about 50 meq of potassium ions supplied from about 0.01 mg to about 11,000 mg of a potassium salt selected from the group consisting of potassium picolinate, potassium aspartate, potassium gluconate, potassium ascorbate, potassium benzoate, potassium phytate, potassium acetate, potassium glutamate, potassium pyruvate, potassium palmitate, potassium caseinate, dipotassium phosphate, potassium trihydrate and/or mixtures thereof.

21. The beverage composition of claim 20 further comprising from about 1 g to about 35 g of a non-fat milk substitute comprising sweet dairy whey, dried corn syrup, sodium caseinate and partially hydrogenated soybean oil.

22. The beverage composition of claim 1 further comprising from about 1 g to about 35 g of a non-fat milk substitute comprising sweet dairy whey, dried corn syrup, sodium caseinate and partially hydrogenated soybean oil.

23. The beverage composition of claim 1 further comprising from about 0.01 meq to about 60 meq of magnesium ions supplied from about 0.1 mg to about 10,000 mg of a magnesium salt selected from the group consisting of magnesium picolinate, magnesium aspartate, magnesium gluconate, magnesium ascorbate, magnesium benzoate, magnesium phytate, magnesium acetate, magnesium caseinate, magnesium glutamate, magnesium pyruvate, magnesium palmitate, dimagnesium phosphate and/or mixtures thereof.

24. The beverage composition of claim 1 further comprising from about 0.01 meq to about 50 meq of potassium ions supplied from about 0.01 mg to about 11,000 mg of a potassium salt selected from the group consisting of potassium picolinate, potassium aspartate, potassium gluconate, potassium ascorbate, potassium benzoate, potassium phytate, potassium acetate, potassium glutamate, potassium pyruvate, potassium palmitate, potassium caseinate, dipotassium phosphate, potassium trihydrate and/or mixtures thereof.

25. A beverage composition suitable for human consumption comprising per 354 ml of composition:
from about 10 ml to about 344 ml of water;
from about 1 g to about 35 g of a non-fat milk substitute comprising sweet dairy whey, dried corn syrup, sodium caseinate and partially hydrogenated soybean oil;
from about 0.01 meq to about 119 meq of calcium ions supplied from about 1 mg to about 9,000 mg of a calcium salt selected from the group consisting of calcium picolinate, calcium aspartate, calcium gluconate, calcium ascorbate, calcium benzoate, tricalcium phosphate and/or mixtures thereof;
from about 0.01 g to about 1000 g of a sweetener; and
from about 0.1 volumes to about 4 volumes of carbon dioxide gas.

26. The beverage composition of claim 25 wherein the sweetener is crystalline fructose, acesulfame K, aspartame, sucralose, fructose polymers, glucose, glucose polymers, glucose syrup, fructose syrup, corn syrup, invert sugar, saccharine, sucrose, crystalline fructose, sugar alcohols, honey, maple sugar, fruit syrups (apple, grape, pear) and/or mixtures thereof.

27. The beverage composition of claim 26 further comprising from about 0.01 g to about 50 g of a flavoring agent.

28. The beverage composition of claim 27 wherein the flavoring agent is selected from the group consisting of chocolate fudge, chocolate, vanilla, vanilla cappuccino, guarana, strawberry, prairie berry, mocha, latte, peach, almond, coconut, raspberry, bubblegum, cotton candy, papaya, saskatoon berry, plains berry, apple, orange, butterscotch, coffee, blueberry, orange, cherry, tea, banana, lemon, lime, grape, watermelon, cola, root beer and/or mixtures thereof.

29. The beverage composition of claim 25 further comprising from about 50 IU to about 600 IU of vitamin D.

30. The beverage composition of claim 25 further comprising from about 0.1 mg to about 1000 mg of vitamin C.

31. The beverage composition of claim 25 further comprising from about 200 IU to about 5000 IU of vitamin A.

32. The beverage composition of claim 25 further comprising from about 0.001 mg to about 0.40 mg of folic acid.

33. The beverage composition of claim 25 further comprising from about 50 IU to about 600 IU of vitamin D; from about 0.1 mg to about 1000 mg of vitamin C; from about 200 IU to about 5000 IU of vitamin A and from about 0.001 mg to about 0.4 mg of folic acid and/or 50 IU to 500 IU vitamin E and/or 0.0002 g to 0.0009 g lutein and/or 0.0002 g to 0.0009 g zeaxanthin and/or mixtures thereof.

34. The beverage composition of claim 25 further comprising from about 0.15 g to about 0.70 g of a preservative.

35. The beverage composition of claim 34 wherein the preservative is benzoic acid or a benzoate compound selected from the group consisting of sodium benzoate, potassium benzoate, calcium benzoate, magnesium benzoate, citric acid, lactic acid and/or mixtures thereof.

36. The beverage composition of claim 25 wherein the composition has a pH of from about 4.7 to about 7.0.

37. The beverage composition of claim 25 further comprising lactase in an amount sufficient to at least partially eliminate the activity of milk lactose.

38. The beverage composition of claim 25 wherein the water comprises distilled water or purified water and/or mixtures thereof.

39. The beverage composition of claim 25 further comprising from about 0.01 meq to about 60 meq of magnesium ions supplied from about 0.1 mg to about 10,000 mg of a magnesium salt selected from the group consisting of magnesium picolinate, magnesium aspartate, magnesium gluconate, magnesium ascorbate, magnesium benzoate, magnesium phytate, magnesium acetate, magnesium caseinate, magnesium glutamate, magnesium pyruvate, magnesium palmitate, dimagnesium phosphate and/or mixtures thereof.

40. The beverage composition of claim 25 further comprising from about 0.01 meq to about 50 meq of potassium ions supplied from about 0.01 mg to about 11,000 mg of a potassium salt selected from the group consisting of potassium picolinate, potassium aspartate, potassium gluconate, potassium ascorbate, potassium benzoate, potassium phytate, potassium acetate, potassium glutamate, potassium pyruvate, potassium palmitate, potassium caseinate, dipotassium phosphate, potassium trihydrate and/or mixtures thereof.

41. The beverage of claim 25 further comprising $CO_2$ gas added prior to UHT pasteurization to reduce degradation of essential nutrients and suppress bacterial growth.

42. The beverage composition of claim 25 further comprising carbon dioxide to beverages containing milk to improve mouthfeel and acceptance of the product by populations who do not drink or like milk.

43. The beverage of claim 25 further comprising $CO_2$ gas added prior to HTST pasteurization to reduce degradation of essential nutrients and extend shelf life by suppressing bacterial growth.

44. The beverage of claim 25 further comprising $CO_2$ gas added prior to VAT pasteurization to reduce degradation of essential nutrients and extend shelf life by suppressing bacterial growth.

45. The beverage of claim 25 further comprising $CO_2$ gas added to the mixture in a closed vessel without pasteurization to reduce degradation of essential nutrients and extend shelf life by suppressing bacterial growth.

* * * * *